United States Patent
Tachibana (10) Patent No.: US 10,403,068 B2
(45) Date of Patent: Sep. 3, 2019

(54) TERMINAL DEVICE, AUTHENTICATION SYSTEM, AND AUTHENTICATION CONTROL METHOD

(71) Applicant: TOYOTA JIDOSHA KABUSHIKI KAISHA, Toyota-shi, Aichi-ken (JP)

(72) Inventor: Katsuharu Tachibana, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/020,451

(22) Filed: Jun. 27, 2018

(65) Prior Publication Data

US 2019/0043288 A1 Feb. 7, 2019

(30) Foreign Application Priority Data

Aug. 4, 2017 (JP) .................. 2017-151965

(51) Int. Cl.
| | |
|---|---|
| G07C 9/00 | (2006.01) |
| H04W 4/40 | (2018.01) |
| H04L 29/06 | (2006.01) |
| H04W 4/02 | (2018.01) |
| H04W 12/06 | (2009.01) |

(52) U.S. Cl.
CPC ..... G07C 9/00182 (2013.01); G07C 9/00309 (2013.01); H04L 63/0853 (2013.01); H04L 63/107 (2013.01); H04L 63/126 (2013.01); H04W 4/027 (2013.01); H04W 4/40 (2018.02); H04W 12/06 (2013.01); *G07C 2009/0019* (2013.01); *G07C 2009/00769* (2013.01); *G07C 2209/63* (2013.01); *H04W 4/023* (2013.01)

(58) Field of Classification Search
CPC .................. G07C 9/00182; H04L 63/107
USPC ......................................... 340/5.72
See application file for complete search history.

(56) References Cited

U.S. PATENT DOCUMENTS

| | | | |
|---|---|---|---|
| 10,136,256 B2 * | 11/2018 | Godet .................. | H04W 4/023 |
| 2017/0282856 A1 * | 10/2017 | Riedel ..................... | B60R 25/25 |
| 2018/0276926 A1 * | 9/2018 | Hayashi ................ | B60R 25/245 |

FOREIGN PATENT DOCUMENTS

JP  2017-088016 A  5/2017

* cited by examiner

*Primary Examiner* — Vernal U Brown
(74) *Attorney, Agent, or Firm* — Oliff PLC (57) ABSTRACT

A terminal device that executes an authentication sequence through wireless communication with an external device includes a communication unit configured to transmit or receive a radio signal to be used for the authentication sequence, a first measurement unit configured to measure a change in a radio wave intensity for at least a part of the radio signal received by the communication unit; a second measurement unit configured to measure a change in a posture or a position of the terminal device, and a controller configured to determine whether there is a correlation between a measurement result of the first measurement unit and a measurement result of the second measurement unit, i) continue the authentication sequence when the controller determines that there is the correlation, and ii) interrupt the authentication sequence when the controller determines that there is no correlation.

14 Claims, 5 Drawing Sheets

TERMINAL DEVICE, AUTHENTICATION SYSTEM, AND AUTHENTICATION CONTROL METHOD

INCORPORATION BY REFERENCE

The disclosure of Japanese Patent Application No. 2017-151965 filed on Aug. 4, 2017 including the specification, drawings and abstract is incorporated herein by reference in its entirety.

BACKGROUND

1. Technical Field

The present disclosure relates to a communication terminal device (hereinafter referred to as a terminal device), an authentication system including the terminal device, and an authentication control method.

2. Description of Related Art

A terminal device such as an electronic key for a vehicle executes a series of authentication sequences by wirelessly transmitting or receiving signals to or from an in-vehicle device. When the in-vehicle device successfully authenticates the electronic key as a result of the execution of the authentication sequences, a predetermined operation with respect to the vehicle is permitted.

Japanese Unexamined Patent Application Publication No. 2017-88016 (JP 2017-88016 A) discloses a system in which, when a motion sensor provided in a portable device (a terminal device) of a user detects a motion of the portable device, an operation such as a door unlock is permitted based on wireless communication between the portable device and a vehicle (an in-vehicle device), and when the motion sensor does not detect the motion, the operation is not permitted. Thus, when the portable device of the user is stored and stopped, that is, when a determination can be made that a user carries the portable device, does not move, and does not intend to operate the vehicle, the operation of the vehicle is prohibited and security is improved.

SUMMARY

In JP 2017-88016 A, in a case where the terminal device is moving, when wireless communication with the in-vehicle device is possible, the progress of the authentication sequences cannot be restricted and a desired effect is not obtained.

The present disclosure has been made in view of the above problems and provides a terminal device, an authentication system, and an authentication control method that can restrict the progress of an authentication sequence based on wireless communication even when a terminal device is moving.

A first aspect of the present disclosure relates to a terminal device that executes an authentication sequence through wireless communication with an external device. The terminal device includes a communication unit configured to transmit or receive a radio signal to be used for the authentication sequence; a first measurement unit configured to measure a change in a radio wave intensity for at least a part of the radio signal received by the communication unit; a second measurement unit configured to measure a change in a posture or a position of the terminal device; and a controller configured to determine whether or not there is a correlation between a measurement result of the first measurement unit and a measurement result of the second measurement unit, i) continue the authentication sequence when the controller determines that there is the correlation, and ii) interrupt the authentication sequence when the controller determines that there is no correlation.

According to the first aspect of the present disclosure, in a case where radio waves are highly likely not to be directly transferred from a transmission source device even when the terminal device is moving, it is possible to interrupt the authentication sequence and place restrictions not to execute final authentication.

In the terminal device according to the first aspect of the present disclosure, the communication unit may include a multi-axis antenna including a plurality of axes not parallel to each other. The first measurement unit may be configured to measure a change in radio wave intensity for each axis of the multi-axis antenna.

According to the first aspect of the present disclosure, it is possible to acquire a change in the radio wave intensity as a change in a vector of each direction component and obtain a measurement result in which a change in a relative position or a relative posture is reflected more accurately.

In the terminal device according to the first aspect of the present disclosure, the communication unit may include an antenna configured to receive a radio signal in a low frequency (LF) band as the radio signal.

According to the first aspect of the present disclosure, the terminal device according to the present disclosure can be easily applied to an electronic key for a vehicle of the related art that receives an LF signal.

In the terminal device according to the first aspect of the present disclosure, the second measurement unit may include an acceleration sensor and may be configured to measure the change in the posture or the position based on an output of the acceleration sensor.

According to the first aspect of the present disclosure, it is possible to perform accurate measurement based on an acceleration or a gravity occurring in the terminal device.

In the terminal device according to the first aspect of the present disclosure, the acceleration sensor may be a multi-axis acceleration sensor.

In the terminal device according to the first aspect of the present disclosure, the terminal device may be an electronic key for a vehicle.

According to the first aspect of the present disclosure, the terminal device according to the present disclosure can be applied to the electronic key for a vehicle of the related art and provided.

In the terminal device according to the first aspect of the present disclosure, the controller may be configured to cause the communication unit not to transmit the radio signal for the authentication sequence when the controller determines that there is no correlation.

According to the first aspect of the present disclosure, it is possible to interrupt the authentication sequence.

In the terminal device according to the first aspect of the present disclosure, the controller may be configured to cause the communication unit to transmit a radio signal for instructing interruption of the authentication sequence when the controller determines that there is no correlation.

According to the first aspect of the present disclosure, it is possible to interrupt the authentication sequence.

In the terminal device according to the first aspect of the present disclosure, the communication unit may be configured to receive the radio signal transmitted at different timings from a plurality of positions, and the radio signal is used for the authentication sequence. The first measurement unit may be configured to measure a change in the radio wave intensity of the radio signal transmitted from each of the positions. The controller may be configured to determine whether or not there is a correlation between a measurement result of the first measurement unit and a measurement result of the second measurement unit for each of the positions, i) continue the authentication sequence when the controller determines that there is the correlation at all the positions, and ii) interrupt the authentication sequence when the controller determines that there is no correlation in at least one of the positions.

According to the first aspect of the present disclosure, it is possible to improve accuracy of the determination as to the correlation.

In the terminal device according to the first aspect of the present disclosure, the first measurement unit may be configured to calculate a difference vector of the radio wave intensity between radio signals transmitted from the respective positions. The controller may be configured to interrupt the authentication sequence when the difference vector is not in a predetermined range regardless of a result of the determination as to whether there is the correlation.

According to the first aspect of the present disclosure, in a case where radio waves are highly likely not to be directly transferred from a transmission source device, it is possible to interrupt the authentication sequence and place restrictions not to execute final authentication. Even when the terminal device is stopped, the same restrictions can be placed.

A second aspect of the present disclosure relates to an authentication system. The authentication system includes the terminal device described above, and a vehicle including an in-vehicle device that performs the authentication sequence through wireless communication with the terminal device, the in-vehicle device being the external device.

According to the second aspect of the present disclosure, in a case where radio waves are highly likely not to be directly transferred from the in-vehicle device, it is possible to interrupt the authentication sequence, place restrictions not to execute final authentication, and prohibit an operation of the vehicle.

In the authentication system according to the second aspect of the present disclosure, the in-vehicle device may include an in-vehicle communication unit including a reception antenna and a transmission antenna and configured to transmit or receive the radio signal to be used for the authentication sequence, and an in-vehicle controller that performs control such that the in-vehicle communication unit performs transmission or reception of the radio signal.

A third aspect of the disclosure relates to an authentication system. The authentication system includes the terminal device described above, and a vehicle including an in-vehicle device that performs the authentication sequence through wireless communication with the terminal device, the in-vehicle device being the external device. The in-vehicle device is configured to transmit the radio signal to be used for the authentication sequence from a plurality of positions of the vehicle.

According to the third aspect of the present disclosure, it is possible to improve accuracy of the determination.

In the authentication system according to the third aspect of the present disclosure, the in-vehicle device may include an in-vehicle communication unit including a reception antenna and a plurality of transmission antennas and configured to transmit or receive the radio signal to be used for the authentication sequence, and an in-vehicle controller that performs control such that the in-vehicle communication unit performs transmission or reception of the radio signal.

A fourth aspect of the present disclosure relates to an authentication control method that is executed by a terminal device that executes an authentication sequence through wireless communication with an external device. The authentication control method includes: transmitting or receiving a radio signal to be used for the authentication sequence; measuring a change in a radio wave intensity for at least a part of the received radio signal; measuring a change in a posture or a position of the terminal device; and determining whether or not there is a correlation between a measurement result of the change in the radio wave intensity and a measurement result of the change in the posture or the position, i) continuing the authentication sequence when the controller determines that there is the correlation, and ii) interrupting the authentication sequence when the controller determines that there is no correlation.

According to the fourth aspect of the present disclosure, in a case where radio waves are highly likely not to be directly transferred from a transmission source device even when the terminal device is moving, it is possible to interrupt the authentication sequence and place restrictions not to execute final authentication.

According to the aspects of the present disclosure, it is possible to provide a terminal device, an authentication system, and an authentication control method that can restrict progress of an authentication sequence based on wireless communication even when a terminal device is moving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

In an authentication system according to embodiments of the present disclosure, a terminal device and an in-vehicle device of a stopped vehicle execute a predetermined authentication sequence through wireless communication. The terminal device measures a change in a radio wave intensity of a radio signal and a change in a posture or a position of the terminal device itself. A determination is made whether there is a constant correlation between measurement results of the two changes described above. When a determination is made that there is the correlation, the authentication sequence is continued, and when there is no correlation, the authentication sequence is not continued. For example, when there is no correlation, radio waves are highly likely not to be directly transferred from the in-vehicle device of the stopped vehicle, and therefore, it is desirable for such authentication not to be performed as described above. In the present disclosure, even when the terminal device is moving, progress of the authentication sequence can be restricted.

Hereinafter, embodiments of the present disclosure will be described in detail with reference to the drawings.

First Embodiment

Configuration

Figure 1:
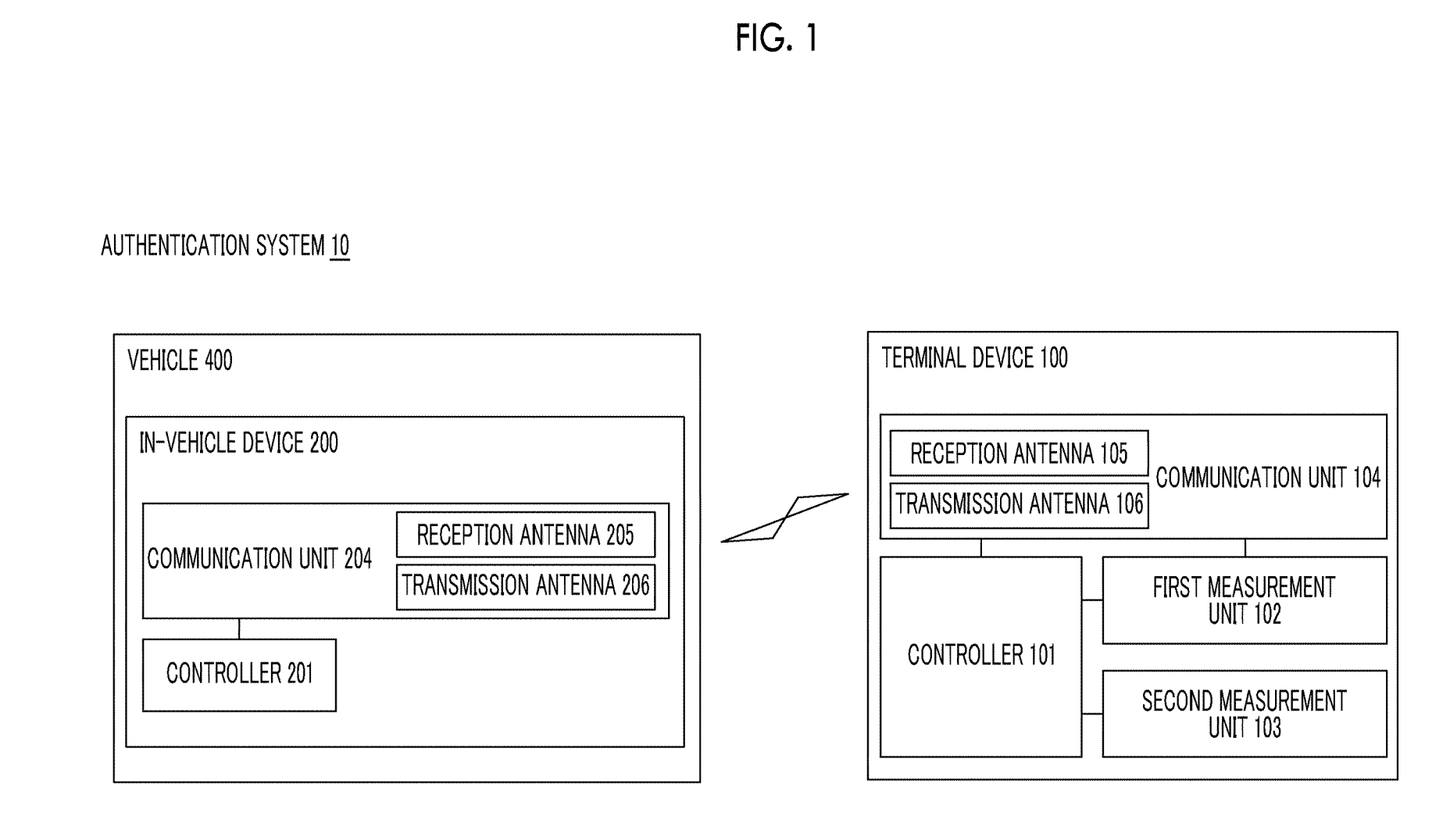
FIG. 1 is a functional block diagram of an authentication system according to a first embodiment of the present disclosure.

FIG. 1 is a functional block diagram of an authentication system 10 according to a first embodiment. The authentication system 10 includes a terminal device 100 and a vehicle 400 on which an in-vehicle device 200, which is an external device as viewed from the terminal device 100, is mounted. The terminal device 100 is a portable small device and is typically an electronic key for the vehicle 400. The terminal device 100 includes a communication unit 104, a first measurement unit 102, a second measurement unit 103, and a controller 101. The communication unit 104 includes a reception antenna 105 and a transmission antenna 106. The in-vehicle device 200 includes a communication unit 204 and a controller 201. The communication unit 204 includes a reception antenna 205 and a transmission antenna 206. The in-vehicle device 200 mounted on the vehicle 400 executes a series of authentication sequences through wireless communication with the terminal device 100 carried by a user in the vicinity of the outside of the stopped vehicle 400 and permits various vehicle operations such as a door unlocking operation of the user when the authentication is successful.

Figure 2:
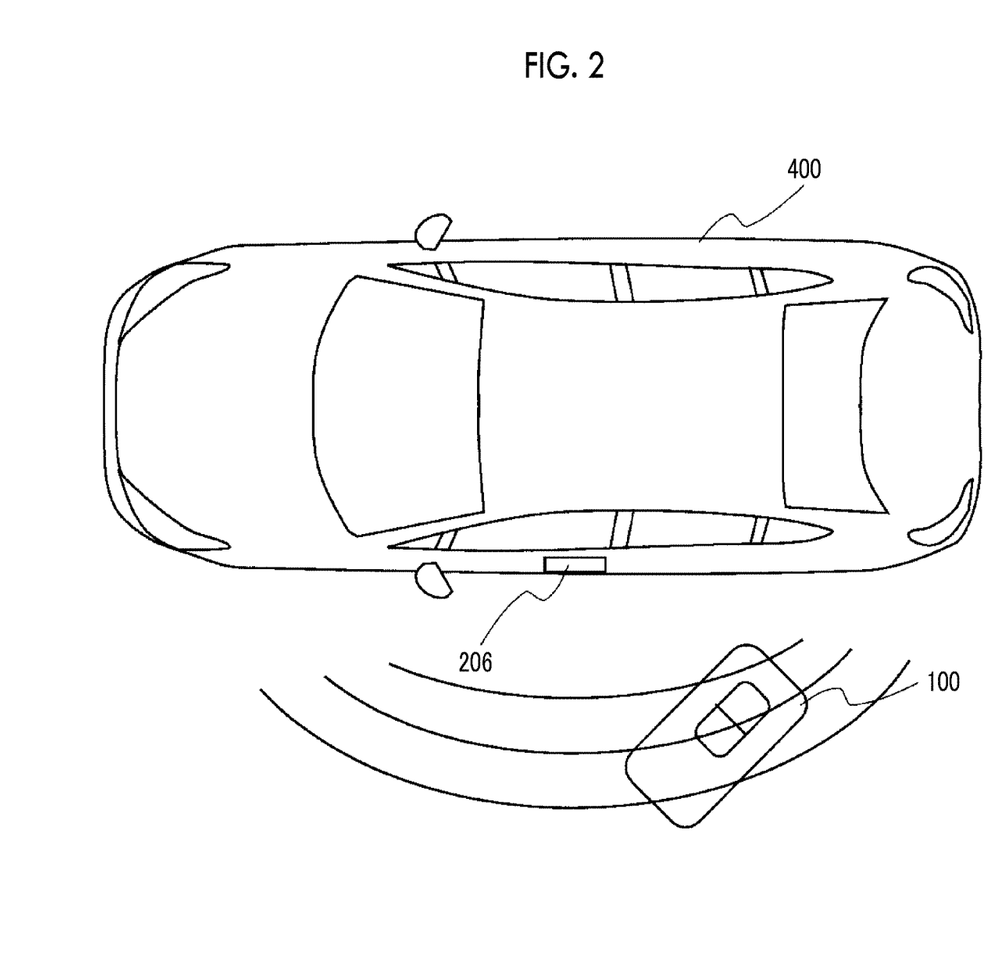
FIG. 2 is a schematic diagram illustrating some magnetic force lines of a radio signal that is transmitted from a transmission antenna included in a vehicle according to the first embodiment of the present disclosure.

The controller 101 of the terminal device 100 and the controller 201 of the in-vehicle device 200 perform transmission and reception of radio signals to and from the communication unit 104 and the communication unit 204 according to a predetermined scheme in order to execute authentication sequences, respectively. Typically, a signal transmitted by the transmission antenna 206 of the communication unit 204 of the in-vehicle device 200 and received by the reception antenna 105 of the communication unit 104 of the terminal device 100 is an LF signal which is a signal at a frequency in an LF band, and a signal transmitted by the transmission antenna 106 of the communication unit 104 of the terminal device 100 and received by the reception antenna 205 of the communication unit 204 of the in-vehicle device 200 is a radio frequency (RF) signal which is a signal at a frequency higher than the LF signal. FIG. 2 schematically illustrates a state in which some magnetic force lines of the LF signal transmitted from the transmission antenna 206 included in the vehicle 400 pass through the terminal device 100.

The first measurement unit 102 of the terminal device 100 can detect a radio wave intensity of the LF signal received by the reception antenna 105 and measure a temporal change in the radio wave intensity. The reception antenna 105 is, for example, a triaxial antenna, and the first measurement unit 102 is preferably able to detect radio wave intensities of three axes not parallel to each other. By using a multi-axis antenna as described above, it is possible to acquire the temporal change in the radio wave intensity as a change in a three-dimensional vector including all components in respective directions, and to obtain a measurement result in which a change in a relative position or a relative posture between the antenna transmitting the LF signal and the reception antenna 105 is reflected more accurately.

The second measurement unit 103 of the terminal device 100 is, for example, an acceleration sensor, and can detect an acceleration or a gravity occurring in the terminal device 100 itself and accurately measure a posture or a position, and a temporal change of the posture or the position. Preferably, the acceleration sensor is, for example, a triaxial acceleration sensor, and the second measurement unit 103 can detect an acceleration along three axes not parallel to each other. By using a multi-axis acceleration sensor as described above, it is possible to acquire a change in the posture or the position of the terminal device 100 as a change in a three-dimensional vector including all components in respective directions and obtain a measurement result in which the change in the position or the posture is reflected more accurately.

Operation

Figure 3:
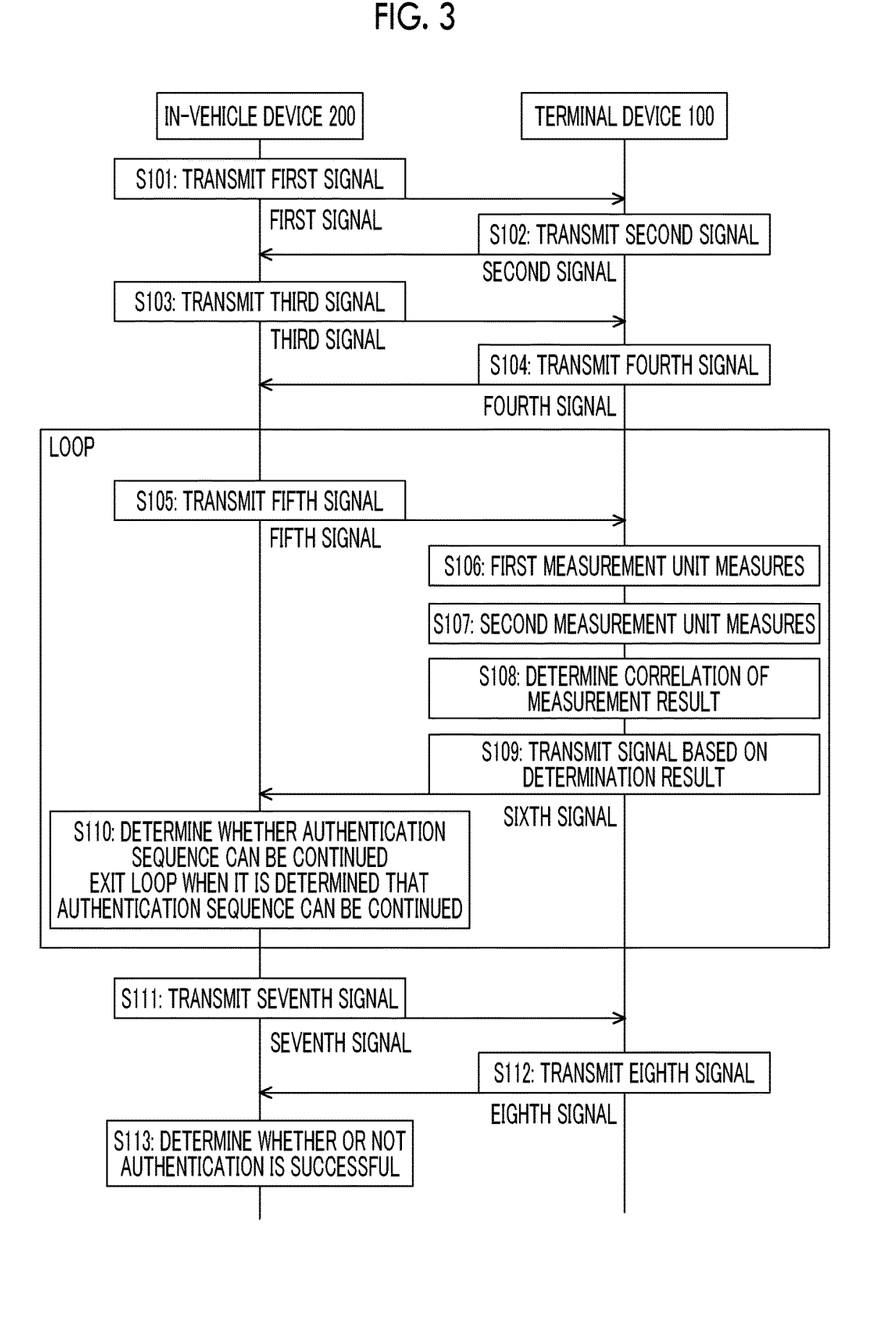
FIG. 3 is a process sequence diagram of an electronic key system according to the first embodiment of the present disclosure.

A process that is performed by the authentication system 10 will be described. FIG. 3 illustrates a process sequence that is executed when the in-vehicle device 200 and the terminal device 100 of the authentication system 10 can perform communication.

Step S101: The controller 201 of the in-vehicle device 200 causes the communication unit 204 to transmit a first signal from the transmission antenna 206. The communication unit 104 of the terminal device 100 receives the first signal from the reception antenna 105.

Step S102: When the first signal is received, the controller 101 of the terminal device 100 causes the communication unit 104 to transmit a second signal which is a response signal to the first signal from the transmission antenna 106. The communication unit 204 of the in-vehicle device 200 receives the second signal from the reception antenna 205. For example, the first signal is a polling signal that is periodically transmitted to confirm whether or not the terminal device 100 is present near the vehicle 400. The controller 201 of the in-vehicle device 200 repeats transmission of the first signal before the reception of the second signal is confirmed.

Step S103: The controller 201 of the in-vehicle device 200 causes the communication unit 204 to transmit a third signal from the transmission antenna 206. The communication unit 104 of the terminal device 100 receives the third signal from the reception antenna 105.

Step S104: When the third signal is received, the controller 101 of the terminal device 100 causes the communication unit 104 to transmit a fourth signal which is a response signal to the third signal from the transmission antenna 106. The communication unit 204 of the in-vehicle device 200 receives the fourth signal from the reception antenna 205. For example, the third signal is a signal including an identifier such as a type of the vehicle 400, and the fourth signal is a signal that the controller 101 of the terminal device 100 transmits when a determination is made that the terminal device 100 corresponds to the identifier included in the third signal.

Step S105: The controller 201 of the in-vehicle device 200 causes the communication unit 204 to transmit a fifth signal from the transmission antenna 206. The communication unit 104 of the terminal device 100 receives the fifth signal from the reception antenna 105. The processes from step S105 to step S110 are executed as a loop until a determination is made in step S110 that the process exits the loop.

Step S106: When the fifth signal is received, the controller 101 of the terminal device 100 causes the first measurement unit 102 to measure a radio wave intensity of the fifth signal. The first measurement unit 102 measures the radio wave intensity, and calculates a difference between the radio wave intensity measured at this time and a radio wave intensity measured at a previous time when there is the radio wave intensity measured at a previous time in the loop (when this time is a second or subsequent reception of the fifth signal). This difference between the radio wave intensities indicates a change pattern of the radio wave intensity and is calculated as a three-dimensional vector, for example.

Step S107: When the fifth signal is received, the controller 101 of the terminal device 100 causes the second measurement unit 103 to measure a posture or a position (hereinafter, referred to as a posture or the like) of the terminal device itself. When there is a posture or the like measured at a previous time (when this time is a second or subsequent reception of the fifth signal) in the loop, the second measurement unit 103 calculates a difference between the posture or the like measured at this time and the posture or the like measured at the previous time. This difference between the postures or the like indicates a change pattern of the posture or the like of the terminal device 100 and is calculated as a three-dimensional vector as an example. An order of execution of steps S106 and S107 does not matter, but it is desirable for steps S106 and S107 to be executed in parallel at the same time such that measurement timings match.

Step S108: when the change pattern of the radio wave intensity and the change pattern of the posture or the like are calculated in steps S106 and S107, the controller 101 of the terminal device 100 determines whether or not there is a predetermined correlation between the two change patterns described above. Here, the correlation means that a motion pattern relative to a transmission source of the fifth signal indicated by the change pattern of the radio wave intensity and an absolute motion pattern based on the acceleration indicated by the change pattern of the posture or the like match or are similar to each other. For example, when a magnitude of the difference vector of the two change patterns is equal to or smaller than a predetermined value, a determination can be made that there is the correlation, and a determination method is not limited thereto. A correspondence model of the change in the posture or the like and the change in the radio wave intensity may be created from a distribution model of the radio wave intensity of the LF signal or the like, and a correlation model may be determined based on a degree of similarity to the correspondence model.

Step S109: The controller 101 of the terminal device 100 causes the communication unit 104 to transmit the sixth signal which is a signal including a determination result in step S108 from the transmission antenna 106. The communication unit 204 of the in-vehicle device 200 receives the sixth signal from the reception antenna 205.

Step S110: The controller 201 of the in-vehicle device 200 refers to the determination result included in the sixth signal, and returns to step S105 when the determination result is a determination result indicating that there is no correlation, and the in-vehicle device 200 and the terminal device 100 repeat the loop. When the determination result is a determination result indicating that there is the correlation, the process exits the loop and proceeds to step S111.

Step S111: The controller 201 of the in-vehicle device 200 causes the communication unit 204 to transmit a seventh signal from the transmission antenna 206. The communication unit 104 of the terminal device 100 receives the seventh signal from the reception antenna 105.

Step S112: When the seventh signal is received, the controller 101 of the terminal device 100 causes the communication unit 104 to transmit an eighth signal which is a response signal to the seventh signal from the transmission antenna 106. The communication unit 204 of the in-vehicle device 200 receives the eighth signal from the reception antenna 205. The seventh signal and the eighth signal are a challenge signal and a response signal for performing authentication based on a challenge response scheme, for example.

Step S113: The controller 201 of the in-vehicle device 200 determines whether or not authentication is successful based on the eighth signal. The in-vehicle device 200 permits an operation such as unlocking of the vehicle when a determination is made that the authentication is successful, and does not permit the operation of the vehicle when a determination is made that the authentication is not successful.

In the above example, the authentication sequence is executed by a series of wireless communications for transmitting or receiving the first to eighth signals. A determination is made as to whether or not there is a correlation between the change pattern of the radio wave intensity based on the fifth signal and the change pattern of the posture or the like of the in-vehicle device 200 before a determination is made as to whether or not final authentication is successful based on the transmission and reception of the seventh and eighth signals, and when there is no correlation, the final authentication is not executed. As described above, the terminal device 100 can instruct the in-vehicle device 200 to continue or interrupt the authentication sequence by transmitting the sixth signal including the determination result for the correlation. Content and a format of the sixth signal is not limited as long as it can be identified from the content and the format that the in-vehicle device 200 is instructed to continue or interrupt the authentication sequence.

The change pattern of the radio wave intensity and the change pattern of the posture or like are calculated according to the difference between the measurement value at a previous time and the measurement value at this time in steps S106 to S108, and the present disclosure is not limited thereto and may be calculated based on values measured at three or more times. A method of measuring the change pattern of the radio wave intensity and the change pattern of the posture or the like or a method of determining the correlation is not limited, and a suitable method may be selected.

Conditions for exiting the loop are not limited as long as the final authentication can be prevented from being executed when there is no correlation. For example, in step S110, the controller 201 of the in-vehicle device 200 does not immediately exit the loop when the determination result included in the sixth signal indicates that there is a correlation, and may exit the loop when receiving the sixth signal including a determination result indicating that there is the correlation. When the sixth signal including the determination result indicating that there is no correlation is received a plurality of times, the repetition of the execution of step S105 may be stopped so that the fifth signal is not transmitted. An erroneous determination can be reduced by being based on results of a plurality of determinations. When the controller of the terminal device 100 determines that there is no correlation in step S109, the controller of the terminal device 100 may not transmit the sixth signal. In this case, in step S110, when the sixth signal is not received for a predetermined period, the controller 201 of the in-vehicle device 200 may operate similarly to a case where the sixth signal including the determination result indicating that there is no correlation is received as described above.

Effects

The change pattern of the radio wave intensity based on the fifth signal and the change pattern of the posture or the like of the in-vehicle device 200 have a correlation even when the terminal device 100 is moving as long as the fifth signal is directly transferred from the transmission antenna 206 of the in-vehicle device 200 mounted on the stopped vehicle 400 to the reception antenna 105 of the terminal device 100. Therefore, when there is no correlation, the fifth signal is highly likely not to be directly transferred from the transmission antenna 206 of the in-vehicle device 200. According to the first embodiment, it is possible to interrupt the authentication sequence in such a case and place restrictions not to execute the final authentication.

Second Embodiment

Configuration

Figure 4:
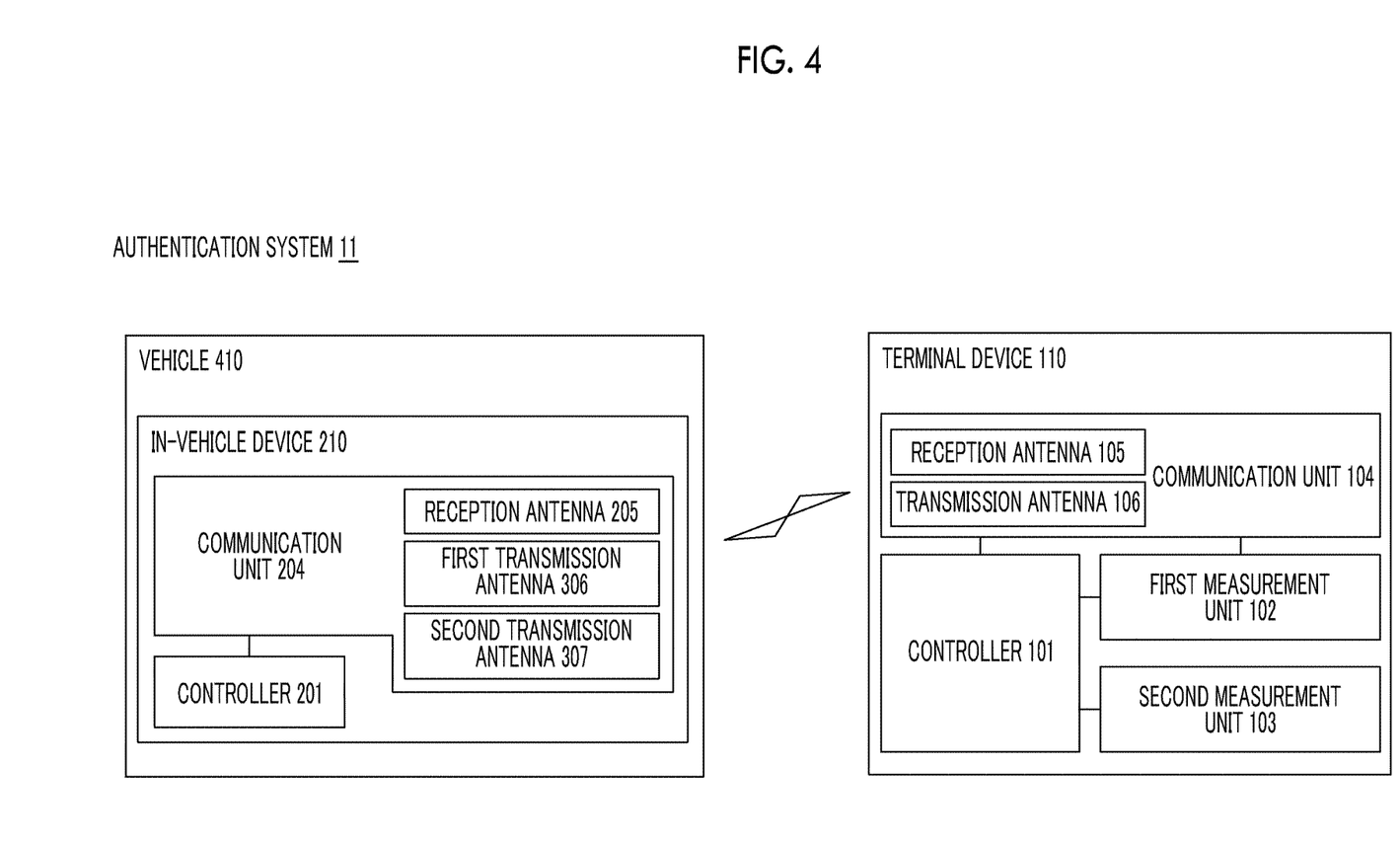
FIG. 4 is a functional block diagram of an authentication system according to a second embodiment of the present disclosure.
Figure 5:
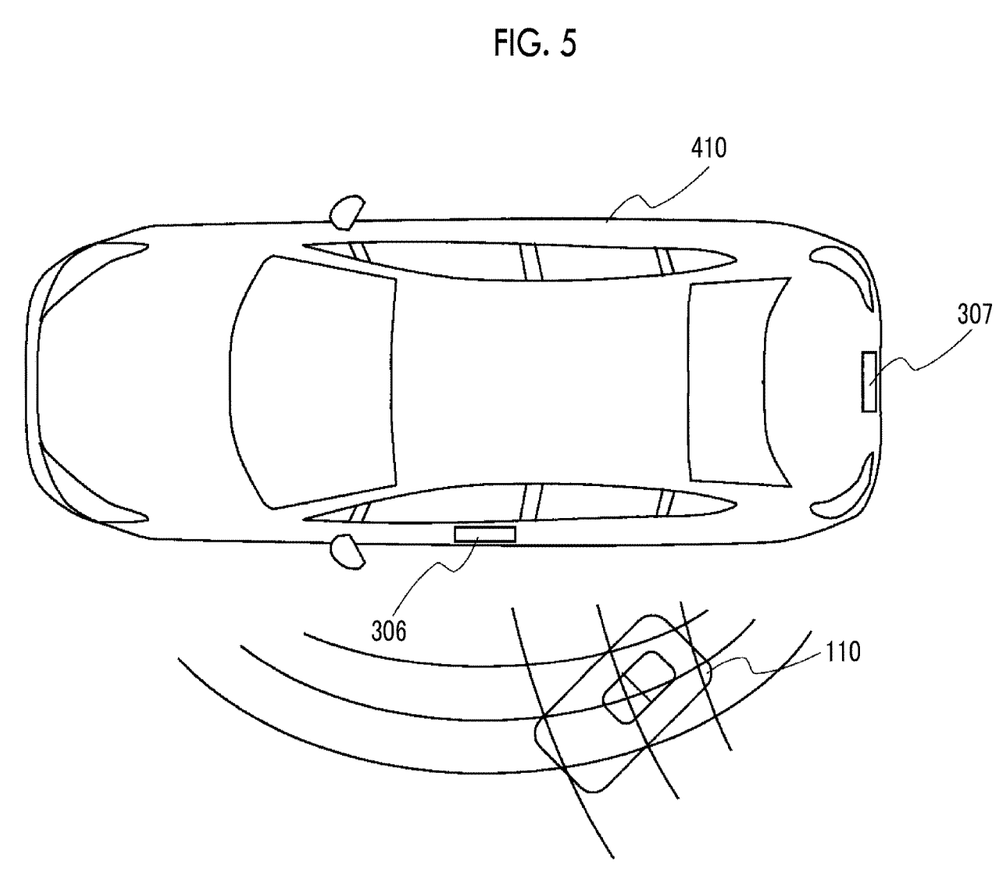
FIG. 5 is a schematic diagram illustrating some magnetic force lines of a radio signal that is transmitted from a transmission antenna included in a vehicle according to the second embodiment of the present disclosure.

FIG. 4 illustrates a functional block diagram of an authentication system 11 according to a second embodiment. The authentication system 11 is different from the authentication system 10 according to the first embodiment in that the authentication system 11 includes a terminal device 110 and a vehicle 410 on which an in-vehicle device 210 is mounted, and the in-vehicle device 210 includes a first transmission antenna 306 and a second transmission antenna 307. Description of the same matters as those of the first embodiment will be omitted. FIG. 5 schematically illustrates a state in which some magnetic force lines of the LF signal transmitted from the first transmission antenna 306 and the second transmission antenna 307 included in the vehicle 410 pass through the terminal device 110. The first transmission antenna 306 is provided at the same position as the transmission antenna 206 in the first embodiment, and the second transmission antenna 307 is provided at a different position.

Operation

In the second embodiment, the in-vehicle device 210 and the terminal device 110 perform wireless communication as in the first embodiment to execute an authentication sequence. In this case, the controller 201 of the in-vehicle device 210 controls the communication unit 204 so that first, third, fifth, and seventh signals are transmitted using the first transmission antenna 306. Further, the controller 201 controls the communication unit 204 so that at least the fifth signal is transmitted from the second transmission antenna 307. However, the signal from the second transmission antenna 307 is transmitted at a timing different from a timing at which the first transmission antenna 306 transmits a signal such that interference is avoided.

The processes from step S106 to step S108 illustrated in FIG. 3 are performed on the fifth signals transmitted from the first transmission antenna 306 and the second transmission antenna 307. That is, the change pattern of the radio wave intensity is measured for each of the fifth signal transmitted from the first transmission antenna 306 and the fifth signal transmitted from the second transmission antenna 307, and a correlation between each change pattern of the radio wave intensity and the change pattern of the posture or the like of the terminal device 100 is determined. In step S108, solely when there is a correlation between each change pattern of the radio wave intensity and the change pattern of the posture, a final determination may be made that there is the correlation. Identification of the fifth signal can be performed by, for example, including an identifier of a transmission source antenna to be included in the fifth signal.

In the second embodiment, the following process may be further performed. That is, the first measurement unit 102 measures the change pattern of the radio wave intensity for each of the fifth signal transmitted from the first transmission antenna 306 and the fifth signal transmitted from the second transmission antenna 307, and calculates a difference between the respective radio wave intensities. It is desirable for the difference to be a vector difference. The controller 101 may determine whether or not the vector difference in a constant range caused by a relative positional relationship between the first transmission antenna 306 and the second transmission antenna 307 has occurred. That is, a determination is made whether or not the vector difference is in a predetermined range, and when the vector difference is not in the predetermined range, the sixth signal transmitted in step S109 is a signal for instructing the in-vehicle device 200 to interrupt the authentication sequence regardless of a determination result for the correlation in step S108. A range of the vector difference serving as a determination reference can be appropriately determined based on a range of a vector difference that can be generated in a position range in which the fifth signal can be directly received. The range of the vector difference may be solely a magnitude or may include a direction. In a case in which the range includes the direction, the direction may be corrected according to a posture of the terminal device 110 measured by the second measurement unit 103.

Effects

It is possible to improve accuracy of the determination in comparison with that in the first embodiment by performing the determination of the correlation between the change pattern of the radio wave intensity and the change pattern of the posture or the like on radio waves transmitted from the transmission antennas at two different positions.

Further, when the fifth signals respectively transmitted from the first transmission antenna 306 and the second transmission antenna 307 of the in-vehicle device 210 mounted on the vehicle 410 are directly transferred to the reception antenna 105 of the terminal device 100, the respective radio wave intensity vectors have a constant vector difference caused by the relative positional relationship between the first transmission antenna 306 and the second transmission antenna 307. Therefore, when there is no vector difference as described above, the fifth signal is highly likely not to be directly transferred from the first and second transmission antennas. According to the second embodiment, even in the case as described above, it is possible to restrict the authentication sequence not to be executed to the end. The determination based on the vector difference as described above can be performed even when the terminal device 110 is stopped, the amount of change in the radio wave intensity and the amount of change in the posture or the like are small, and accuracy of the determination as to the correlation of each change pattern is insufficient. The number of transmission antennas is not limited to two, and signals transmitted from three or more transmission antennas may be used for a determination. The determination of the correlation using the change pattern of the posture or the like may not be performed, and solely the determination using a difference between the radio wave intensity vectors of the signals from the plurality of antennas may be performed.

The authentication sequence described in each of the above embodiments is an example, and content of the radio signal and a procedure and a format of transmission and reception are not limited thereto. A radio signal serving as a measurement target of the radio wave intensity may be any radio signal as long as it is before a final authentication is executed.

The present disclosure can be regarded as not only a configuration of functional blocks of an authentication system or a terminal device but also a method to be executed by the authentication system or the terminal device including a processor.

The present disclosure is useful for an electronic key system for a vehicle or the like.

What is claimed is:

1. A terminal device that executes an authentication sequence through wireless communication with an external device, the terminal device comprising:
    a communication unit configured to transmit or receive a radio signal to be used for the authentication sequence;
    a first measurement unit configured to measure a change in a radio wave intensity for at least a part of the radio signal received by the communication unit;
    a second measurement unit configured to measure a change in a posture or a position of the terminal device; and
    a controller configured to
        determine whether there is a correlation between a measurement result of the first measurement unit and a measurement result of the second measurement unit,
        i) continue the authentication sequence when the controller determines that there is the correlation, and
        ii) interrupt the authentication sequence when the controller determines that there is no correlation by causing the communication unit not to transmit the radio signal for the authentication sequence when the controller determines that there is no correlation.

2. The terminal device according to claim 1, wherein:
    the communication unit includes a multi-axis antenna including a plurality of axes not parallel to each other; and
    the first measurement unit is configured to measure a change in radio wave intensity for each axis of the multi-axis antenna.

3. The terminal device according to claim 1, wherein the communication unit includes an antenna configured to receive a radio signal in a low frequency band as the radio signal.

4. The terminal device according to claim 1, wherein the second measurement unit includes an acceleration sensor and is configured to measure the change in the posture or the position based on an output of the acceleration sensor.

5. The terminal device according to claim 4, wherein the acceleration sensor is a multi-axis acceleration sensor.

6. The terminal device according to claim 1, wherein the terminal device is an electronic key for a vehicle.

7. The terminal device according to claim 1, wherein:
    the communication unit is configured to receive the radio signal transmitted at different timings from a plurality of positions, the radio signal being used for the authentication sequence;
    the first measurement unit is configured to measure a change in the radio wave intensity of the radio signal transmitted from each of the positions; and
    the controller is configured to
        determine whether there is a correlation between a measurement result of the first measurement unit and a measurement result of the second measurement unit for each of the positions,
        i) continue the authentication sequence when the controller determines that there is the correlation at all the positions, and
        ii) interrupt the authentication sequence when the controller determines that there is no correlation in at least one of the positions.

8. The terminal device according to claim 7, wherein:
    the first measurement unit is configured to calculate a difference vector of the radio wave intensity between radio signals transmitted from the respective positions; and
    the controller is configured to interrupt the authentication sequence when the difference vector is not in a predetermined range regardless of a result of the determination as to whether there is the correlation.

9. An authentication system comprising:
    the terminal device according to claim 7; and
    a vehicle including an in-vehicle device that performs the authentication sequence through wireless communication with the terminal device, the in-vehicle device being the external device,
    wherein the in-vehicle device is configured to transmit the radio signal to be used for the authentication sequence from a plurality of positions of the vehicle.

10. The authentication system according to claim 9, wherein the in-vehicle device includes
    an in-vehicle communication unit including a reception antenna and a plurality of transmission antennas and configured to transmit or receive the radio signal to be used for the authentication sequence, and
    an in-vehicle controller that performs control such that the in-vehicle communication unit performs transmission or reception of the radio signal.

11. An authentication system comprising:
    the terminal device according to claim 1; and
    a vehicle including an in-vehicle device that performs the authentication sequence through wireless communication with the terminal device, the in-vehicle device being the external device.

12. The authentication system according to claim 11, wherein the in-vehicle device includes
    an in-vehicle communication unit including a reception antenna and a transmission antenna and configured to transmit or receive the radio signal to be used for the authentication sequence, and
    an in-vehicle controller that performs control such that the in-vehicle communication unit performs transmission or reception of the radio signal.

13. A terminal device that executes an authentication sequence through wireless communication with an external device, the terminal device comprising:
    a communication unit configured to transmit or receive a radio signal to be used for the authentication sequence;
    a first measurement unit configured to measure a change in a radio wave intensity for at least a part of the radio signal received by the communication unit;
    a second measurement unit configured to measure a change in a posture or a position of the terminal device; and
    a controller configured to
        determine whether there is a correlation between a measurement result of the first measurement unit and a measurement result of the second measurement unit, i) continue the authentication sequence when the controller determines that there is the correlation, and ii) interrupt the authentication sequence when the controller determines that there is no correlation by causing the communication unit to transmit a radio signal for instructing interruption of the authentication sequence when the controller determines that there is no correlation.

14. An authentication control method that is executed by a terminal device that executes an authentication sequence through wireless communication with an external device, the authentication control method comprising:

transmitting or receiving, by a communication unit, a radio signal to be used for the authentication sequence;

measuring a change in a radio wave intensity for at least a part of the received radio signal;

measuring a change in a posture or a position of the terminal device; and determining, by a controller, whether there is a correlation between a measurement result of the change in the radio wave intensity and a measurement result of the change in the posture or the position, i) continuing the authentication sequence when the controller determines that there is the correlation, and ii) interrupting the authentication sequence when the controller determines that there is no correlation by causing the communication unit not to transmit or receive the radio signal for the authentication sequence when the controller determines that there is no correlation.

* * * * *